INVENTORS
HUBERT G. WOLFF
JACK (NMI) ROGERS
HOMER H. DAMOUDE
BY
ATTORNEYS

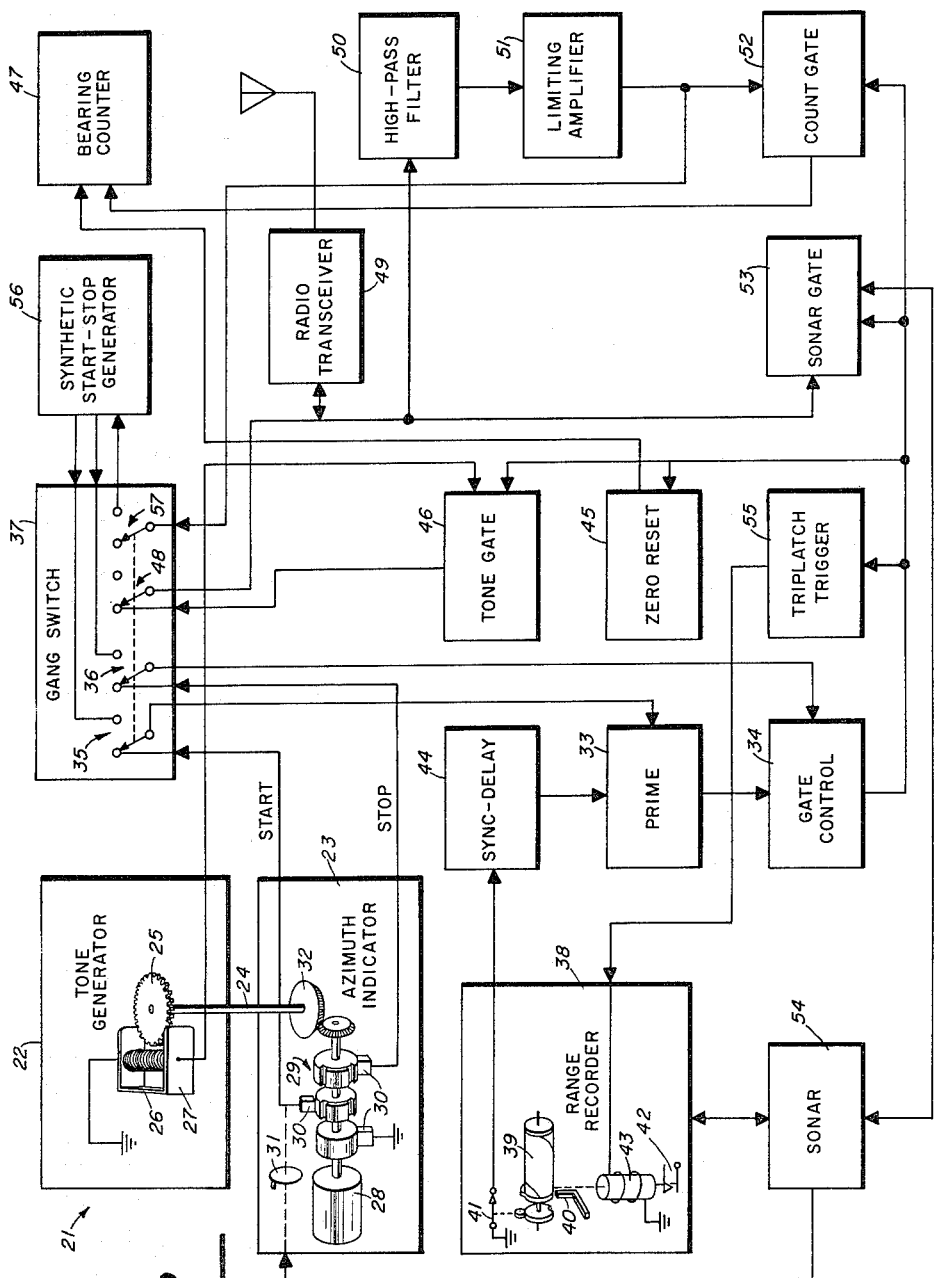

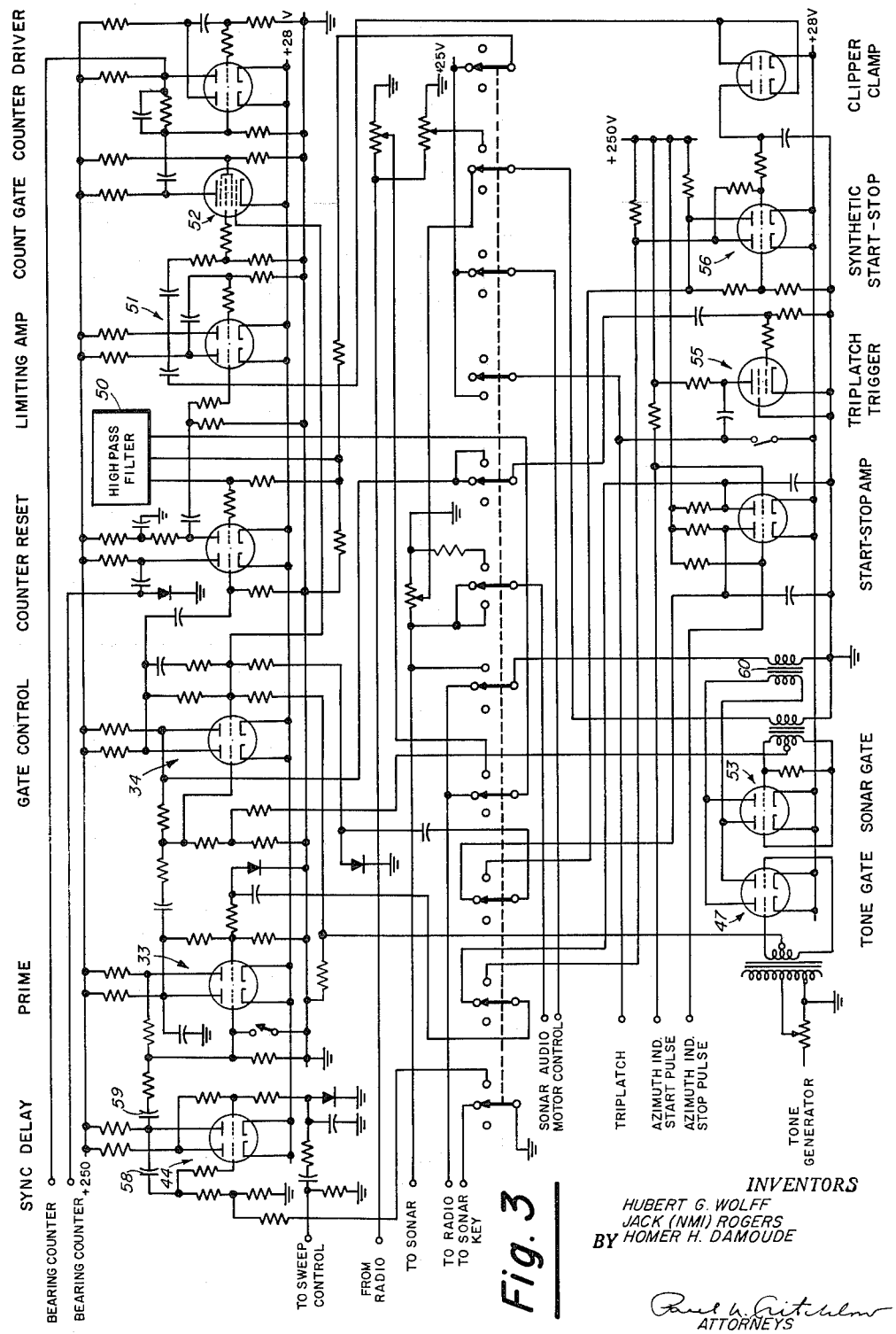

3,092,803
DIPPED SONAR DATA TRANSMISSION SYSTEM
Hubert G. Wolff, Jack Rogers, and Homer H. Da Moude, San Diego, Calif., assignors to the United States of America as represented by the Secretary of the Navy
Filed Jan. 12, 1960, Ser. No. 2,082
8 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

The present invention relates generally to data transmission and telemetering systems wherein data obtained at a remote source is relayed to a home or control location and vice versa with optimum fidelity. In particular, the present invention concerns a dipped sonar transmission system, herein named Sodatran, which communicates information, such as target range and bearing data acquired by a sonar system disposed within an aircraft at some remote location, to a control position for display and examination thereat.

For many years, sonar equipment has been installed on surface vessels and found to be practical for many purposes. However, the speed limitation, vulnerability and the like of surface ships made it apparent that use of appropriate aircraft, such as a helicopter, as a platform would definitely be desirable from an operational standpoint. Aircraft installation, for instance, would permit search to be conducted more rapidly and effectively by towing or dipping the sonar transducer in the water. The aircraft would practically be invulnerable to submarine attack and the greater search speeds would enable considerably greater areas to be searched for any given period of time with reduced probability of detection by the enemy, due to substantially eliminating the broadcast of ordinary operational noise through the water by the carrier vessel.

Although it is true that use of aircraft as a search tool in conjunction with sonar equipment produced numerous operational improvements, it is not without its difficulties and adverse effects as well. For example, transmitting sonar data by voice from an aircraft via the radio-communication channel introduces a delay in transmission which is objectionable in hunter-killer operations. The number of persons through which the information passes and the dual use of the radio channel frequently gives rise to confusion and error. Moreover, the high ambient noise level of aircraft is not conducive to good voice communication.

The present invention overcomes most of the objectionable features of the prior art methods and systems in that data may be transmitted automatically, thus eliminating the intermediate persons necessary for operation by the voice method which, in turn, reduces probable error to a considerable extent. In addition, it has been determined that automatic transmission of the sonar data to a remote location such as a surface vessel or land station by the subject invention facilitates target detection and classification, inasmuch as examination of the data may take place in relatively quiet surroundings and in an unconfined area which lends itself to the study of said data by any desired number of people, some of whom may be far more expert in the data interpretation field than the aircraft operators.

It is, therefore, and important object of this invention to provide an improved system for transmitting data between two or more remotely located stations.

Another object of this invention is to provide a system for transmitting analog and digital data with improved fidelity between a plurality of remotely disposed stations.

A further object of this invention is to provide a method and means for automatically transmitting sonar data between a plurality of remotely disposed stations without the necessity of intermediate operator communication or activity.

Another object of this invention is to provide a data transmission system which will operate in conjunction with a sonar system in such manner as to substantially eliminate ambient noise interference created by the aircraft in which said data transmission and sonar systems are installed.

A further object of this invention is to provide an improved sonar data transmission system which facilitates target detection and classification by permitting accurate data regarding same to be examined in an unconfined area by a plurality of interpretation experts located at a station remote from the data sensing and transmission position.

Another object of this invention is to provide a means for accurately and automatically relaying sonar data without delay from a rapidly flying aircraft containing a sonar system having its transducer towed or dipped underwater during the transmission of said data.

A further object of this invention is to provide a dipped sonar data transmission system which will expedite target search operations by enabling the sonar apparatus to rapidly traverse and search a relatively large area in a short period of time.

Another object of this invention is to provide a means for searching enemy targets with minimum probability of detection thereby, due to the use of an aircraft as the sonar system carrier vehicle.

Other objects and many of the attendant advantages of this invention will be readily appreciated as the same becomes better understood by reference to the following detailed description when considered in conjunction with the accompanying drawings wherein:

FIG. 2 shows a block diagram of a preferred embodiment of the invention; and

FIG. 3 illustrates a schematic diagram of an exemplary preferred embodiment of the invention in more detailed form.

Figure 1:
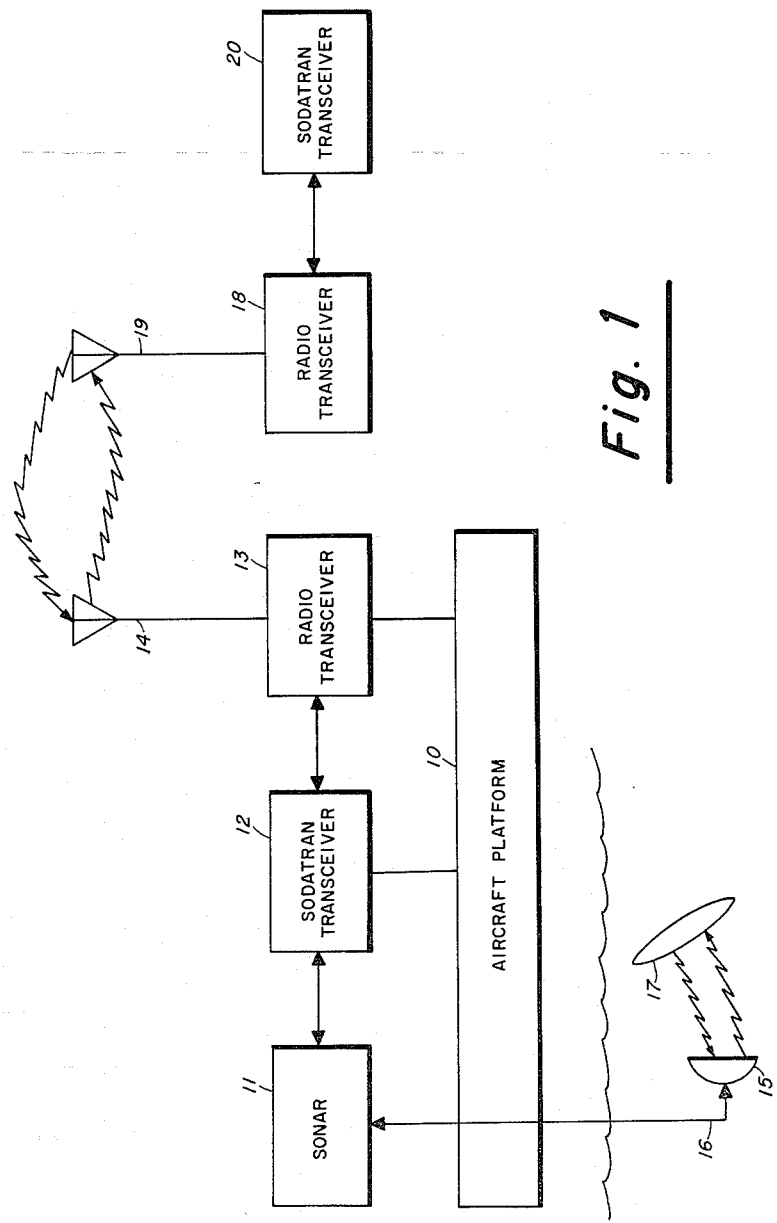
FIG. 1 is a block diagram illustrating the overall communication system in which the Sodatran equipment is employed.

Referring now to the drawings, wherein like reference characters designate like or corresponding parts throughout the several views, there is shown in FIG. 1 an aircraft platform 10 of the helicopter, airplane, missile type or the like, which physically supports a sonar apparatus 11, a Sodatran transceiver 12 of the type constituting this invention connected to said sonar apparatus for two-way communication therebetween, and a radio transceiver 13 coupled for two-way communication to said Sodatran transceiver. Radio transceiver 13 includes an antenna 14 of the type conventional for both transmission and reception of intelligence signals. Sonar 11 includes a transducer 15 adapted to be submerged in water mounted on a support 16 physically connected to said aircraft platform. For illustrative purposes, signals are being projected from transducer 15 to a target 17 where they are reflected back to said transducer for further manipulation, in turn, by the remainder of the sonar apparatus, the Sodatran, and the radio.

A remotely based receiving monitor station used in conjunction with the aforementioned equipment includes a radio transceiver 18 having an antenna 19 adapted to transmit signals to and receive signals from antenna 14. Connected for two-way communication to radio 18 is another Sodatran unit of the type which may be similar to or identical with Sodatran 12.

The operation of this entire system is exceedingly simple, in that sonar 11 obtains target information which is conveyed to Sodatran 12 for processing after which it is broadcast by radio 13 and received by radio 18. Processing and conversion into intelligible signals for indication and recording occurs in Sodatran 20 which, of course, is the device monitored at some remote station by those who are expert in the data interpretation art. As shown, the entire communication procedure is reversible if so desired. Although the sonar system, the radio transceivers, and the aircraft platforms maybe selected as appropriate from many conventional types for use in the subject system, the Sodatran transceiver of this invention is unique per se, as will be fully explained below, and the entire communication system is thus new and advantageous due to the unique arrangement of the combined components.

Referring now to FIG. 2, a Sodatran transceiver 21 of the type which may be substituted for Sodatrans 12 and 20 in FIG. 1 is shown in the transmit condition with said Sodatran having a tone generator 22 connected to and synchronized with the start-stop triggers of an azimuth indicator 23 by a shaft or coupling 24.

The tone generator consists of a tone wheel 25 having eighteen teeth in the preferred embodiment but, of course, may contain as many teeth as any particular circumstance may demand. The tone wheel is disposed within a magnetic field produced by a coil 26 wound on an extended permanent magnet core 27 and is rotated by a drive motor 28 at a speed of the order 10,000 r.p.m. The tone wheel thus generates a 3,000 cycle per second alternating voltage in the coil winding by increasing and decreasing the reluctance of the magnetic path through the core and coil.

The start-stop trigger includes a commutator 29 consisting of two segments, one of which covers about 30 degrees of rotation and the other of which covers about 330 degrees of rotation, neglecting the width of the insulation therebetween, with the 330° segment grounded. A plurality of brushes 30 ride on the commutator; one start, one stop, one or more grounded. The action of the start and stop brushes breaking contact with ground respectively effects a start and a stop signal. The start brush is geared directly to an azimuth pointer 31 which is properly correlated with the sonar set, while the stop brush is fixed, so that the interval between a start and stop signal will be proportional to the target bearing in degrees. Shaft 24 interconnects the tone wheel of the tone generator and the commutator of the start-stop trigger through a 20-to-1 worm reduction 32. It can readily be seen that the tone wheel and the commutator run continuously at 10,000 and 500 r.p.m., respectively, which, in turn, causes the commutator to generate 500 start-stop signals per minute or one pair per revolution. And since the tone wheel runs twenty times as fast as the commutator, 360 teeth of the tone wheel pass under the pole pieces during one revolution of the commutator when an eighteen teeth tone wheel is employed. If the start-stop brushes are spaced 180 degrees apart, then 180 cycles will be generated by the tone wheel between the start-stop signals. Likewise, if the start-stop brushes are spaced 89 degrees apart, then 89 cycles will be generated by the tone wheel between the start-stop signals.

The azimuth indicator output start-stop signals are negative and are connected respectively to a prime 33 and a gate control 34 through contacts 35 and 36 of a gang switch 37. Both the prime and gate control circuits are bi-stable multivibrators which are timely insensitive to said start-stop signals, since they are negative in potential and are fed to the cut-off grids.

A range recorder 38 which may be either an integral part of the sonar equipment or an external part cooperatively associated with the sonar equipment includes a rotatable recording helix 39 having a triplatch 40 and cam-operated end-of-sweep contacts 41, sonar keying contacts 42, and a solenoid 43 for actuating said triplatch and said sonar keying contacts.

Upon completing a revolution, the range recorder helix is hooked and stopped by the triplatch, and the cam-operated end-of-sweep contacts are closed. A signal defined as a go signal is produced and is sent to a sync delay 44 which waits approximately 0.1 second before sending a delayed go signal to the prime. The prime circuit immediately flips to its start sensitive condition, allowing the next start signal from the commutator to flip it back, thereby generating a signal which is fed from the prime to the gate control to flip same to its stop sensitive condition. When a subsequent stop signal arrives at the gate control from the commutator, it is flipped back, and all three circuits—the commutator, the prime, and the gate control—are in their original condition. In the meantime, however, the two flips of the gate control have generated a pair of start-stop triggers which control all other operations of the Sodatran unit.

The start trigger generated by the gate control is fed to a zero reset 45, the output of which is connected to a bearing counter 47 to timely reset same to zero in preparation for a new count. The new count, of course, is originally generated by tone generator 22, as previously mentioned, and is proportional to the target bearing at that particular instant. It is applied to a tone gate 46 where it is gated in accordance with the interval between the start and stop triggers. In other words, tone gate 46 is opened by the start trigger and closed by the stop trigger, and when the tone gate is open, the bearing tone is passed therethrough and on through switch contacts 48 to a radio transceiver 49 for broadcast and to a high pass filter 50. During normal operation, the bearing tone being 3,000 cycles per second is well above the cutoff frequency of the high pass filter, so it readily passes on to a limiting amplifier 51 for wave shaping and then to a count gate 52. Count gate 52 is paralleled with tone gate 46 so that it is also open during the time interval between the start-stop triggers, thus allowing the bearing tone to pass therethrough and on to the bearing counter at that time. The bearing counter circuit counts the individual cycles of the 3,000 cycle per second bearing tone and displays the total as numerals from 1 to 360.

A sonar gate 53 is connected to receive the triggers from the gate control and is also connected to receive the sonar data from a sonar unit 54 when the subject system is being used in the transmit condition. The tone gate and the sonar gate are arranged to operate alternately, that is, the tone gate is open and passes the bearing tone while the sonar gate is cut off and closed, and the sonar gate is open and passes the sonar range data while the tone gate is cut off and closed, thus preventing interference between their outputs. Hence, when acting as a transmitter, the radio alternately broadcasts the tone and sonar gate outputs, which consists of several seconds of sonar range data interrupted by a short burst of 3,000 cycles per second tone which contains the transducer bearing infomation.

The stop trigger from the gate control timely closes the tone and count gates, ending the bearing tone, and also triggers a triplatch trigger 55 which, in turn, releases range recorder helix 39 and keys the sonar transmitter to start the next sonar cycle by energizing solenoid 43 and actuating latch 40 and sonar keying contacts 42, respectively.

Briefly, the over-all sequence of operation when the subject data transmission system is acting as a transmitter is as follows:

The gang switch is set as depicted in FIG. 2. The end-of-sweep signal flips the sync delay multivibrator which waits about 0.1 second before returning to its original state and flipping the prime. The start signal then flips the prime back which flips the gate control and generates a start trigger. The start trigger actuates the bearing counter zero, reset, sets the bearing counter to zero, opens the tone and count gates, and closes the sonar gate. The tone gate passes the bearing tone through the waveshaper circuits and the count gate to the bearing counter. The stop signal from the commutator flips the gate control back, generating a stop trigger which fires the triplatch trigger, closes the tone and count gates—thus stopping the count—and opens the sonar gate. The triplatch relay operates, pinging the sonar transducer and releasing the range recorder helix. The sonar unit feeds the range recorder writing pens and the sonar gate which, in turn, modulates the radio transmitter. After being released, the recording helix makes one complete revolution, at the end of which the triplatch is again latched an the end-of-sweep contacts are closed and the sweep cycle is ready to be repeated.

When it is desired to use the Sodatran in a data receive condition, gang switch 37 is manually shifted to close the right hand contacts shown in FIG. 2. Being a receiver as well as a transmitter, radio transceiver 49 is also changed to the data reception position. Since the bearing data will be supplied by the sending station via the radio link, start and stop signals are not needed to generate a bearing count; however, start and stop signals are needed to actuate the various gates used in the receive condition. To supply this need, a synthetic start-stop generator 56 is substituted for the start and stop signals of the azimuth indicator. Due to switch contacts 48 being opened, the tone generator and the tone gate are effectively deactivated as far as the remainder of the Sodatran receiving circuits are concerned. The synthetic start-stop generator is synchronized by the incoming radio signal which is waveshaped by high pass filter 50 and limiting amplifier 51 before it is fed thereto through switch contacts 57. Actually, the synthetic start-stop generator produces a start signal each time a signal of predetermined amplitude passes the high pass filter. It has been found to be desirable in the preferred embodiment to design the cutoff frequency of the high pass to be about 1,900 cycles per second. Then, in the absence of interference, only the bearing tone will be effective, causing the start signal to be generated with the leading edge of the first cycle and a stop signal to occur when a cycle of tone fails to arrive. The prime and gate circuits and other components are otherwise connected to function exactly as in the send condition.

Briefly, the over-all sequence of operation of the subject Sodatran in the receive condition is as follows:

The gang switch is set to close all of the right hand contacts. The end-of-sweep flips the sync delay and the sync delay returns after a one-tenth second delay to the original state, flipping the prime. The bearing count arrives via the radio link and enters the wave-shaper circuits. The leading edge of the bearing count flips the synthetic start-stop generator which returns the prime to its original condition to flip the gate control and generate a start trigger. The start trigger actuates the zero reset to effect bearing counter zeroing, opens the count gate, and closes the sonar gate, thus permitting the received data signal to pass through the count gate and on to the bearing counter where it is counted and displayed as before. The end-of-bearing count signal allows the synthetic start-stop generator to return to its initial condition, thereby generating a synthetic stop signal which flips the gate control back to generate a stop trigger. The stop trigger fires the triplatch trigger, closes the count gate, and opens the sonar gate. The radio receiver output data passes to the sonar unit and to the range recorder helix associated therewith for recording purposes. After the triplatch is triggered, the range recorder helix makes one revolution and is again latched. At that time the end-of-sweep contacts are closed and the sweep cycle is ready to be repeated.

Although the Sodatran unit is disclosed in the preferred embodiments as being used in conjunction with a sonar system, inasmuch as it is essentially a data transmission system, its use is not necessarily so limited. For example, it would be well within the purview of one skilled in the art to substitute practically any pertinent echo-ranging system for the sonar system without violating the spirit and teachings of this invention. Likewise, computers having appropriate data outputs and inputs could be combined with the subject Sodatran for data transmission therebetween.

To facilitate better understanding of the subject invention a more detailed explanation of an exemplary arrangement of some of the components showing in block diagram form in FIG. 2 are further illustrated in FIG. 3.

Because the tone generator, the azimuth indicator, and the range recorder have been explained in some detail above, further elaboration concerning same in connection with FIG. 3 appears to be superfluous here. Likewise, inasmuch as sonar equipment, radio equipment, and analog and digital counters of conventional types may be readily employed in conjunction with the subject Sodatran system by the artisan from the teachings herein disclosed, further detailed descriptions thereof are omitted. Therefore, all of these items will hereinafter be referred to in a general manner by their respective aforementioned names only.

Referring now to FIG. 3 the sync delay 44 is shown as a one-shot multivibrator with one-half thereof normally conducting because of the grid return to the plate of the other half while the other half is normally cut off by a 28 volt cathode bias. Making of the end-of-sweep contact in the range recorder momentarily pulls the grid of one-half of said multivibrator below cutoff thereby flipping the circuit to the condition where the other half conducts while holding the grid of the first half below cutoff. Conduction in the conducting section is maintained until a capacitor 58 charges sufficiently to allow the grid of the other section to drop slightly below the cathode potential, returning the circuit to its original condition. The time required to charge capacitor 58 is of the order of 0.1 second in the transmit condition and a few milliseconds in the receive condition. A capacitor 59 differentiates the output of said multivibrator and feeds it to the grid of the prime circuit. The resulting signal on the grid of the prime is a positive spike followed by a negative spike, the two being separated by the amount of the delay. The input section of the prime is conducting for the positive spike has no effect, but the negative signal causes the prime to flip.

The prime 33 and gate control 34 coupled thereto generate a single pair of triggers, one start and one stop, for each operation of the sync delay circuit. Since start-stop signals are arriving at the rate of 500 per minute from the commutator brushes, the trigger circuit must reject all except the first set arriving after a closed signal from the sync delay. Rejection of start-stop signals is accomplished by shaping them into negative pulses and impressing them upon cutoff grids of the prime and gate control circuits which are bi-stable multi-vibrators. The prime and the gate control circuit are therefore insensitive to start-stop signal until end-of-sweep signal causes the sync delay to operate as described above. A negative pulse coupled to the prime through capacitor 59 flips it to its start-stop sensitive condition, there it remains until a start signal flips it back. Upon returning to its insensitive condition, the prime generates a negative pulse which is coupled to the gate control circuit. This causes the gate control to flip to its stop-sensitive condition, thereby generating a start trigger. A stop trigger is generated by the next stop signal from the commutator, which flips the gate control back to its original insensitive condition. The prime circuit is actually a gate which will pass only one start signal from the commutator to the gate control upon receipt of a go signal from the sync delay. Similarly, the gate control is unable to act upon the stop signals continuously arriving until it has received a start signal from the prime. After the start signal has been received, only the first subsequently arriving stop signal is effective. Thus, the first set of start-stop signals to arrive after a signal from the sync delay circuit is passed on to the other circuits of the equipment, controlling all other functions of the system.

The output triggers from the gate control are simultaneously applied to the tone and sonar gates. These gates are push pull amplifiers with a common plate load. The two gates operate alternately, since their bias is supplied from opposite sides of the gate control. The tone gate passes the 3,000 cycle voltage from tone wheel 25 while the sonar gate is cut off, and the sonar gate passes the sonar audio while the tone gate is cut off. Note that the tone gate passes tone only during the interval of time between a start and a stop trigger, thereby gating a definite number of cycles. During the remainder of the time, the sonar gate passes the output of the sonar receiver. A transformer 60 is common to both gates and feeds the transmitter modulator during the time that the Sodatran is in a send condition, but when the subject Sodatran system is operating in the receive condition, the tone gate is ineffective and the tone from the tone wheel is switched off. In this position, the sonar gate is fed from the radio receiver, and its output goes to the writing blade of the range recorder and to the earphone jacks of the sonar unit.

Triplatch trigger 55 is likewise coupled to the gate control to receive the output trigger therefrom. It is a thyratron having a voltage of the order of 28 volts of fixed cathode bias. A positive stop trigger from the gate control fires the thyratron, energizing the triplatch relay in the range recorder. The thyratron is subsequently extinguished by the inductive kickback from the triplatch relay. In the standby condition, 28 volts is continuously applied to the triplatch solenoid, allowing the range recorder helix to rotate continuously for normal operation of the sonar.

In addition, the output triggers from the gate control are applied to the zero reset 45 and count gate 52. The counter of the bearing counter must be zeroed before each count is applied thereto, but since the negative stop trigger from the gate control has no effect upon the zero reset circuit, the positive start trigger from the gate control causes zero reset 45 to generate a negative zeroing pulse which is coupled to the counters of bearing counter 47.

In the embodiment of FIG. 3, a three-stage RC coupled limiting amplifier is used to convert the 3,000 cycle per second bearing count into sharp high-amplitude triggers suitable for driving the decade counter. A threshold control is provided which allows the amplitude of the input to the high pass filter to be adjusted so that the peaks of the 3,000 cycle bearing signal will be amplified while the lower frequencies are attenuated by said filter and remain below the cutoff level so as to be rejected by the limiting amplifier.

The limiting amplifier output is fed to the counter driver through the count gate, which is gated on or off by the gate control circuit. The counter is a one-shoe multivibrator which generates a negative pulse for each positive signal from the count gate. The decade counters of the bearing counter count the negative pulses from the counter driver and display the total by means of lighted numbers or otherwise as desired.

The over-all sequence of operation is substantially the same for this embodiment shown in considerable detail in FIG. 3 as in the embodiment illustrated in block diagram form in FIG. 2. When the Sodatran unit is being operated in the transmit condition, the end-of-run signal from the range recorder flips the sync delay multivibrator. The sync delay waits about one-tenth second before returning to its original state and flipping the prime. The start signal from the start amplifier flips the gate control, generating a start trigger. This start trigger operates the zero reset to effect zeroing of the bearing counter. It also operates to open the tone gate and the count gate and, at the same time, close the sonar gate.

The tone gate passes the bearing information tone to the three-stage amplifier and wave shaping circuits, from which it passes through the count gate to the counter driver and on to the bearing counter. The stop signal from the stop amplifier flips the gate control back, generating a stop trigger which fires the triplatch trigger thyratron, and through the bias voltage dividers, closes the tone and count gate stopping the count and opening the sonar gate. The triplatch solenoid operates, releasing the range recorder helix, allowing operation of the sonar or any other echo-ranging equipment which is being used therewith. The sonar receiver output feeds the operator's earphones and the writing blade in the range recorder as well as the sonar gate, the latter of which modulates the radio transmitter. The recording helix completes one revolution, flipping the triplatch and making the end-of-sweep microswitch contacts. At this instance the Sodatran system is in a condition of preparedness for making another target bearing determination sweep.

When the subject Sodatran system is in the receive condition, the following sequence of operation takes place. The end-of-sweep signal flips the sync delay multivibrator. The sync delay returns immediately to its original state, flipping the prime. The bearing count arrives from the radio link, entering the three-stage amplifier and wave shaper. The leading edge of the bearing count flips the synthetic start-stop generator, returning the prime to its original condition, which action flips the gate control and generates a start trigger. The start trigger returns the bearing counter to zero through the zero reset. The gate control through the bias voltage dividers opens the tone and count gate, and closes the sonar gate. Although the tone gate is open at this time, it is effectively deactivated, thus preventing any tone from the tone generator from passing therethrough during the Sodatran receive condition. The bearing count passes the open count gate to the counter driver which, in turn, operates the counter to display the target bearing. The end-of-bearing count allows the synthetic start-stop generator to return to its initial condition, thereby generating a synthetic stop signal, which flips the gate control back to generate a stop trigger. The stop trigger fires the triplatch thyratron while the gate control through the bias voltage dividers closes the tone and count gates and opens the sonar gate. The output of the radio receiver passes the open sonar gate to feed the operator's earphones and the writing blade of the range recorder. The recording helix completes one revolution, hooking the triplatch, and making the end-of-sweep contact in preparation for repeating the entire sweep cycle.

What is claimed is:

1. A telemetering system adapted to transmit and receive data comprising in combination an echo-ranging apparatus for generating a first pair of signals representing the range and bearing of a first target, a radio transceiver adapted for broadcasting said first pair of signals to a remote receiving station and receiving a second pair of signals representing the range and bearing of a second target transmitted from a remote sending station, a sonar data transmission transceiver interconnecting said echo-ranging apparatus and said radio transceiver for response to said first and second pairs of range and bearing signals and for respectively indicating same during broadcast and reception thereof, and switch means connected to said sonar data transmission transceiver and radio transceiver for operating same for broadcasting said first pair of indicated range and bearing signals to a remote receiving station and receiving and indicating said second pair of range and bearing signals from a remote sending station.

2. A sonar data telemetering system adapted to transmit and receive position information of submarine targets while substantially eliminating carrier vehicle noise comprising in combination, an aircraft platform, a sonar system mounted on said aircraft platform having an acoustical projector adapted to be dipped and towed under water, said sonar system being capable of generating a first plurality of signals representing the range and bearing of a first submarine target, a radio transceiver mounted on said aircraft platform, said radio transceiver being adapted for timely broadcasting said first plurality of signals to a remote receiving station and receiving a second plurality of signals representing the range and bearing of a second submarine target transmitted from a remote sending station, a sonar data transmission transceiver mounted on said aircraft platform, said sonar data transmission transceiver interconnecting said sonar system and said radio transceiver for response to said first and second pluralities of signals for respectively indicating same during broadcast and reception thereof, and gang switch means connected to said sonar data transmission transceiver and radio transceiver for operating same for broadcasting said first plurality of indicated signals to a remote receiving station and receiving and indicating said second plurality of signals from a remote sending station.

3. The device of claim 2 wherein said sonar data transmission transceiver includes an azimuth indicator and a tone generator connected thereto, a range recorder having a sonar key and end-of-sweep contacts and a solenoid actuator therefor, a sync delay coupled to said range recorder, a bistable multivibrator connected directly to said sync delay and indirectly to said azimuth indicator through said gang switch means, a gate control connected directly to said bistable multivibrator and indirectly to said azimuth indicator through said gang switch means, a tone gate connected to said gate control and said tone generator, a zero reset connected to said gate control, a trip-latch trigger coupled between said gate control and the solenoid actuator of the aforesaid range recorder, a sonar gate connected directly to said gate control, said sonar system and said radio transceiver, and indirectly to said tone gate through the aforementioned gang switch means, a high pass filter coupled to said sonar gate and said radio transceiver, a bearing counter connected to said zero reset and said count gate, a start-stop generator, and a limiting amplifier directly connected between said high pass filter and said count gate and indirectly connected to said start-stop generator through said gang switch means.

4. A sonar data transmission system comprising in combination a sonar means adapted to produce output signals representing the range and bearing of a target, a range recorder responsive to the range output signal from said sonar means for recording the range of said target, azimuth indicator means responsive to the bearing output signal from said sonar means for providing a pair of time separated signals with the time duration therebetween proportional to said target bearing, means for generating a predetermined frequency signal, means connected to said predetermined frequency signal generating means and said azimuth indicator means for gating and passing said predetermined frequency signal during the interval between said pair of time separated signals, thereby generating a signal proportional to said target bearing, means for broadcasting said range output signal and said generated target bearing signal, and means interconnecting said sonar means, said target bearing signal generating means, and said broadcasting means for alternately feeding said range and target bearing signals thereto for broadcast thereof.

5. The device of claim 4 further including means connected to said means interconnecting said sonar means, said target bearing signal generating means, and said broadcasting means for indicating said target bearing.

6. The device of claim 5 wherein said target bearing indicator means is a bearing counter.

7. In a telemetering system adapted for transmission and reception of data, means for measuring the range and bearing of a target and producing a pair of output signals respectively proportional thereto, azimuth indicator means coupled to said measuring means for producing a pair of trigger pulses separated in time in accordance with said measured target bearing, means connected to said azimuth indicator means for producing a predetermined frequency target bearing tone signal of duration equal to the separation time of said pair of trigger pulses, means connected to said target range and bearing measuring means and responsive to said target range output signal and said target bearing tone signal for alternately and consecutively gating same, means for generating a pair of pulses comparable to the aforesaid pair of trigger pulses, a radio transceiver connected to said range and bearing tone signal gating means, said radio transceiver being adapted for broadcasting said target range and bearing tone signals to a remote receiving station and receiving target range and bearing tone signals alternately generated by a remote sending station, switch means connected between said azimuth indicator means and said gating means and between said generating means and said gating means for causing same to be operated for transmission or reception of said target range and bearing signals respectively.

8. A sonar data transmission system comprising in combination, a sonar system, a range recorder having a pair of inputs one of which is coupled to the output of said sonar system, said range recorder having end-of-sweep contacts for producing a go signal output, an azimuth indicator having a start signal output, a stop signal output, and an input with said input coupled to the output of the aforesaid sonar system, a tone generator mechanically synchronized with said azimuth indicator by means of a connecting shaft disposed therebetween, a sync-delay coupled to the go signal output of said range recorder, a bistable multivibrator having one of the inputs thereof connected to the output of said sync-delay, a gate control having one of the inputs thereof coupled to the output of said bisable multivibrator, a first switch means interconnecting the start signal output of said azimuth indicator and the other input of said bistable multivibrator, a second switch means interconnecting the stop signal output of said azimuth indicator and the other input of said gate control, a triplatch trigger connected between the output of said gate control and the other input of said range recorder, a tone gate having one of the inputs thereof coupled to the output of said gate control and the other input thereof coupled to the output of said tone generator, a bearing counter, a zero reset connected between the output of said gate control and the input of said bearing counter, a radio transceiver, a third switch means coupled between the output of said tone gate and the input of said radio transceiver, a sonar gate having a plurality of inputs and an output with one of the inputs thereof coupled to the output of said sonar system and another input thereof coupled to the output of said gate control with the output thereof coupled to the input of said radio transceiver, a high-pass filter having an input coupled to said third switch means and the input of said radio transceiver, a limiting amplifier coupled to the output of said high-pass filter, a fourth switch means, a count gate having one of the inputs thereof coupled to the output of said limiting amplifier and the aforesaid fourth switch means and another input coupled to the output of said gate control and the output thereof connected to the input of said bearing counter, and a start-stop generator connected to said first, second, and fourth switch means.

References Cited in the file of this patent
UNITED STATES PATENTS

| | | |
|---|---|---|
| 2,361,177 | Chilowsky | Oct. 24, 1944 |
| 2,838,741 | Mason | June 10, 1958 |
| 2,869,108 | Smith | Jan. 13, 1959 |